United States Patent [19]

Kubick

[11] Patent Number: 4,639,093

[45] Date of Patent: Jan. 27, 1987

[54] SWITCHABLE BANDWIDTH FILTER

[75] Inventor: Frederick Kubick, White Plains, N.Y.

[73] Assignee: United Technologies Corporation, Hartford, Conn.

[21] Appl. No.: 585,817

[22] Filed: Mar. 2, 1984

[51] Int. Cl.[4] ........................ G02B 27/00; G02F 1/05; G02F 1/21

[52] U.S. Cl. .................................... 350/388; 350/389; 350/404

[58] Field of Search ............... 350/373, 374, 384, 389, 350/388, 390, 392, 393, 400, 403, 406, 355, 356, 404

[56] References Cited

U.S. PATENT DOCUMENTS

| | | | |
|---|---|---|---|
| 2,591,701 | 4/1952 | Jaffe | 88/61 |
| 2,600,962 | 6/1952 | Billings | 88/65 |
| 2,939,142 | 5/1960 | Fernsler | 343/754 |
| 3,257,608 | 6/1966 | Bell et al. | 325/0.5 |
| 3,334,958 | 8/1967 | Appeldorn | 350/211 |
| 3,369,242 | 2/1968 | Johnson | 343/754 |
| 3,393,034 | 7/1968 | Imai | 350/260 |
| 3,445,851 | 5/1969 | Sheldon | 343/754 |
| 3,499,701 | 3/1970 | Macek et al. | 350/150 |
| 3,503,670 | 3/1970 | Kosanke et al. | 350/150 |
| 3,507,550 | 4/1970 | Harris et al. | 350/150 |
| 3,512,864 | 5/1970 | Haertling et al. | 350/389 |
| 3,513,323 | 5/1970 | Sincerbox et al. | 250/225 |
| 3,522,985 | 8/1970 | Rogers | 350/157 |
| 3,528,728 | 9/1970 | Rogers | 350/157 |
| 3,555,987 | 1/1971 | Browning | 95/53 |
| 3,558,215 | 1/1971 | DeLang et al. | 350/150 |
| 3,574,441 | 4/1971 | Harris et al. | 350/150 |
| 3,575,487 | 4/1971 | Ohm et al. | 350/150 |
| 3,575,488 | 4/1971 | Ohm et al. | 350/150 |
| 3,623,795 | 11/1971 | Taylor et al. | 350/150 |
| 3,631,501 | 12/1971 | Buscher et al. | 343/754 |
| 3,744,875 | 7/1973 | Haertling et al. | 350/150 |
| 3,781,086 | 12/1973 | Kumada et al. | 350/150 |
| 3,809,461 | 5/1974 | Baumgardner et al. | 350/302 |
| 3,868,172 | 2/1975 | Ii et al. | 350/404 |
| 3,938,878 | 2/1976 | Fox | 350/150 |
| 4,129,357 | 12/1978 | Frosch et al. | 350/157 |
| 4,154,505 | 5/1979 | Kato et al. | 350/150 |
| 4,197,008 | 4/1980 | Pinnow et al. | 356/150 |
| 4,201,450 | 5/1980 | Trapani | 350/150 |
| 4,222,638 | 9/1980 | Robert | 350/96.14 |
| 4,229,073 | 10/1980 | Lotspeich | 350/150 |
| 4,327,971 | 5/1982 | Kondo et al. | 350/388 |

OTHER PUBLICATIONS

M. B. Klein, *Dielectric Waveguide Modulators at 95 GHz Using LiNbO1*(*), International Journal of Infrared and Millimeter Waves, vol. 3, No. 5 (1982).

M. B. Klein, *Phase Shifting at 94 GHz Using the Electro-Optic Effect in Bulk Crystals, International Journal of Infrared and Millimeter Waves,* vol. 2, No. 2 (1981).

Cecil E. Land and Philip D. Thacher, *Ferroelectric Ceramic Electrooptic Materials and Devices, Proceedings of the IEEE,* vol. 57, No. 5, May 1969.

Duda et al., "Analog Light Scanner and Digital Light Deflector", *IBM Tech. Disc. Bulletin,* vol. 8, No. 9, Feb. 1966, pp. 1242–1243.

*Primary Examiner*—William H. Punter
*Attorney, Agent, or Firm*—Robert P. Sabath

[57] ABSTRACT

A ferroelectric switchable bandwidth filter device for operation at millimeter wavelengths applicable for use as a component in radar systems. Electrode pairs pulse switch fields reversibly to flip-flop the optic axes of the ferroelectric material in several stages of the device from one domain state to the other.

18 Claims, 2 Drawing Figures

SWITCHABLE BANDWIDTH FILTER

The Government has rights in this invention, pursuant to Contract No. DAAK21-81-C-0089 awarded by the Department of the Army.

DESCRIPTION

1. Technical Field

This invention relates to millimeter (MM) wavelength devices employing anisotropic, nonlinear dielectric materials which exhibit electro-optic variability, and more particularly to the design and fabrication of ferroelectric microwave and radar components operable at millimeter wavelengths, in particular frequencies in the range of 95 Gigahertz (GHz).

2. Background Art

Ferroelectric materials have become well known since the discovery of Rochelle salt for their properties of spontaneous polarization and hysteresis. See the *International Dictionary of Physics and Electronics,* D. Van Nostrand Company Inc., Princeton (1956) at pg. 331. Other ferroelectrics including barium titanate have also become familiar subjects of research.

However, the application of the properties of ferroelectric materials to millimeter wavelength devices and radar systems is largely uncharted scientific terrain.

At MM wavelengths, standard microwave practice is hampered by the small dimensions of the working components, such as waveguides and resonant structures. Furthermore, there is a considerable lack of suitable materials from which to make the components. Even beyond this, the manufacturing precision demanded by the small dimensions of the components, makes their construction difficult and expensive. Ferrite phase shifters used at other frequencies are unsuitable, and alternative materials are generally not available.

Ferroelectric materials are accordingly of particular interest, because certain of their dielectric properties change under the influence of an electric field. In particular, an "electro-optic" effect can be produced by the application of a suitable electric field. Furthermore, field-induced ferroelectric domain orientation and reorientation is common to these materials.

As is well known, ferroelectric materials are substances having a non-zero electric dipole moment in the absence of an applied electric field. They are frequently regarded as spontaneously polarized materials for this reason. Many of their properties are analogous to those of ferromagnetic materials, although the molecular mechanism involved has been shown to be different. Nonetheless, the division of the spontaneous polarization into distinct domains is an example of a property exhibited by both ferromagnetic and ferroelectric materials.

A birefringent medium changes the polarization of passing radiation according to the manner in which the medium is orientated with respect to that radiation. If there is a shift in the orientation of the medium as defined by the direction of the optic axis, as would be brought on by domain reorientation in ferroelectrics, the polarization change experienced by the passing radiation will be different.

The polarization change can be understood as follows. Radiation divides into two components upon entering a ferroelectric medium having a suitably aligned optic axis. One component exhibits polarization which is perpendicular to the optic axis (the ordinary ray), and the other component exhibits polarization orthogonal to that of the first, and angled or parallel to the optic axis (the extraordinary ray). The refractive indices of the birefringent material, respectively $n_o$ and $n_e$, determine the different speeds of propagation. The emerging components recombine with an induced relative phase shift which is proportional to the speed differential, times the length of the medium. The phase shift determines the polarization state of the output ray: circular, linear, elliptical or otherwise. The output polarization state or induced polarization change can be changed by reorientating the optic axis with respect to the radiation. This is done by applying a pulsed electric field of sufficient magnitude in the appropriate direction. The electric field acts on the ferroelectric domain structure.

Accordingly, it is an object of this invention to establish a switchable band-pass filter for fast response switching of the bandwidth of millimeter radiation passing through multiple stages of ferroelectric material.

It is an object of this invention to develop a millimeter wavelength switchable band-pass filter device for use in radar systems.

It is an object of the invention to develop a ferroelectric millimeter wavelength switchable band-pass filter for microwave radar switching application at the millimeter wavelength range, which is reversibly switchable between several bandwidth states by domain reorientation of selected one or ones of the optic axes of the ferromagnetic material.

It is a further object of the invention to produce a switchable band-pass filter for use in millimeter wavelength radar systems.

It is a further object of the invention to produce a millimeter wavelength ferroelectric switchable band-pass filter able to process microwave signals by means of selected bandwidths.

It is a further object of the instant invention to produce a millimeter wavelength ferroelectric switchable band-pass filter effective for processing microwave signals in a radar receiver.

DISCLOSURE OF INVENTION

The instant invention calls for the stage-wise disposition of a ferroelectric medium in the path of millimeter wavelength radiation to establish a discretely switchable microwave radar band-pass filter. The ferroelectric material in each stage has an optic axis which can be disposed in a selected one of two orthogonal directions or domain states by the application of a suitably dimensioned electric pulse across one or the other of two pairs of electrodes straddling the medium. Straddling is to mean having one electrode on one side of the medium and another on the other side. Each domain orientation is subject to a single pair of electrodes, and the pairs are crossed for reorienting the axes reversibly between domain states.

Variable polarization is established by reorienting the optic axis with a strong electric field. This changes the character of propagation of the millimeter wavelength radiation. There is no prolonged change in the birefringence, but only an abrupt change in the orientation of the optic axes. This results in a multiple-state device which can be enabled to display a variety of bandwidths. To make the process repeatable, two sets of electrodes are required—one transparent and in the path of propagation to reorient the optic axis to its initial state. In this embodiment, the electrodes disposed along the direction of propagation of the radiation are transparent to the radiation and serve a dual role: that of electrodes and that of linear polarizers. Field application is intermittent, ending after domain reorientation.

BRIEF DESCRIPTION OF DRAWING

The invention will be better understood from the following description taken in conjunction with the accompanying drawing, wherein.

BEST MODE FOR CARRYING OUT THE INVENTION

Figure 1:
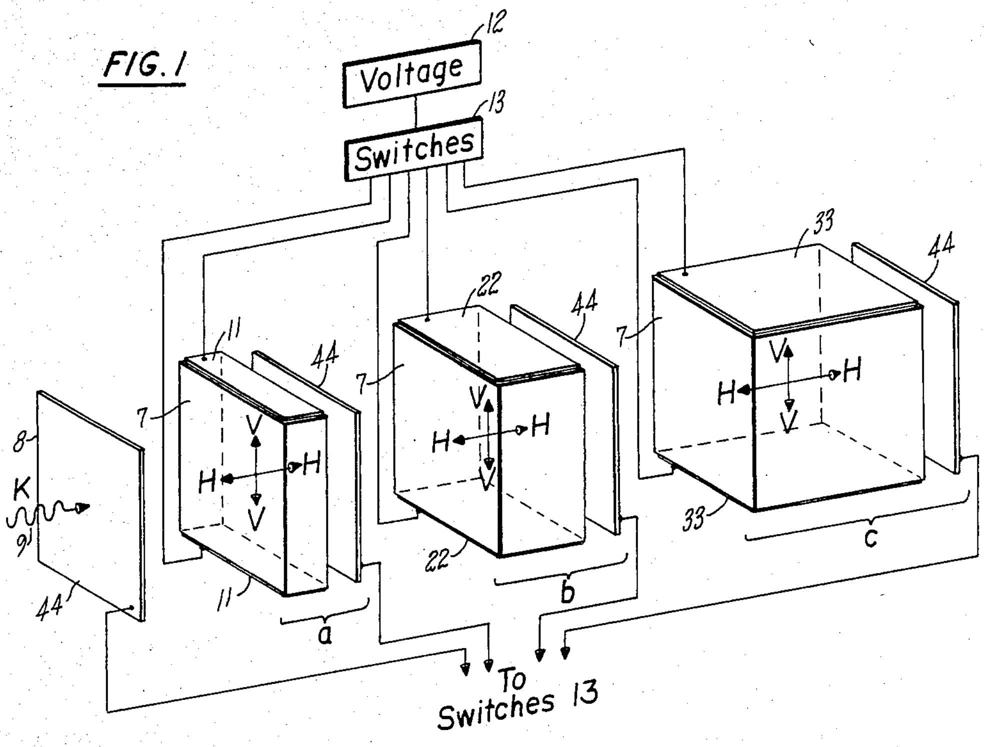
FIG. 1 shows several stages of ferroelectric filter material disposed with pairs of electrodes straddlingly adjacent to its surfaces for selectively applying electric switching fields to reorient its optic axes.

The switchable band-pass filter shown in FIG. 1 includes block *7s* of ferroelectric material subject to incident polarized radiation 9. The direction of propagation of the incident radiation is indicated by arrow "K". The mode of polarization is determined by input polarizer 8, which may also serve as an electrode.

The radiation is characterized, for example, by a frequency of 95 GHz, which corresponds to a millimeter wavelength of 3.16. For convenience, blocks 7 are shown as parallelepipeds in form with each of its surfaces generally parallel to the surface disposed immediately opposite of it. Other forms of geometry would be equally effective, as long as the opposing sides are parallel.

The device includes pairs of electrodes, respectively 11, 22, and 33, for reorienting the optic axis into one of two chosen directions, respectively V—V and H—H. Each member of a particular electrode pair is suitably disposed near an opposite side of its associated ferroelectric block 7 in alignment with a separate one of the two directions open to the optic axis. Additionally, electrodes 44 are transparent to the passage of radiation, and these can be considered to act in pairs, so defined by the specific body of ferroelectric material straddled. Additionally, the transparent electrodes are actually wire grids which act as linear polarizers, said wire grids having a frequency dependent characteristic according to the polarization state of the passing radiation.

In FIG. 1, selected ones of specified electrode pairs can be activated with a suitably strong voltage difference from voltage source 12 effectively to dispose the optic axis in a vertical or horizontal direction, a shown in FIG. 1. Suitable combinations (or permutations) of electrode pairs can be selected. The blocks of material can even be resequenced to restructure the device mechanically. The blocks 7 are of different thicknesses. One block serves as a selected reference thickness and the remaining blocks are of integer multiple thicknesses thereof. The power from voltage source 12 is of course preferably pulsed through selected one or ones of switches 13, because that is all that is needed to reorient the optic axis from one direction to the other.

An electrode pair can orient the optic axes horizontally or parallel to the incident radiation by application of a suitable electric field between the respective members of a selected electrode pair. This is accomplished by switching to apply the voltage difference 12 from electrodes 11 to electrodes 44 and back again. Several of the electrode pairs are shown in crossed relationship to other electrode pairs. For example, electrodes 11, 22 or 33 are crossed with respect to electrodes 44. With the optic axis disposed in the direction of propagation, the ferroelectric material is transparent to the passage of radiation having the initial linear polarization determined by the first wire grid electrode 8.

The duration of time required for imposing the electric field is short and requires no more than a pulse of sufficient magnitude. Only temporary imposition of field strength is required to reorient the optic axis to a new domain state. For domain reorientation, a field pulse of 20 kV/cm, or even as low as 15 kV/cm for some ferroelectrics, may be sufficient. No more than 30 or 40 kV/cm is suggested in order to avoid dielectric breakdown. The process is reversible, with switching or response times in the order of milleseconds possible with typical ferroelectric materials.

Figure 2:
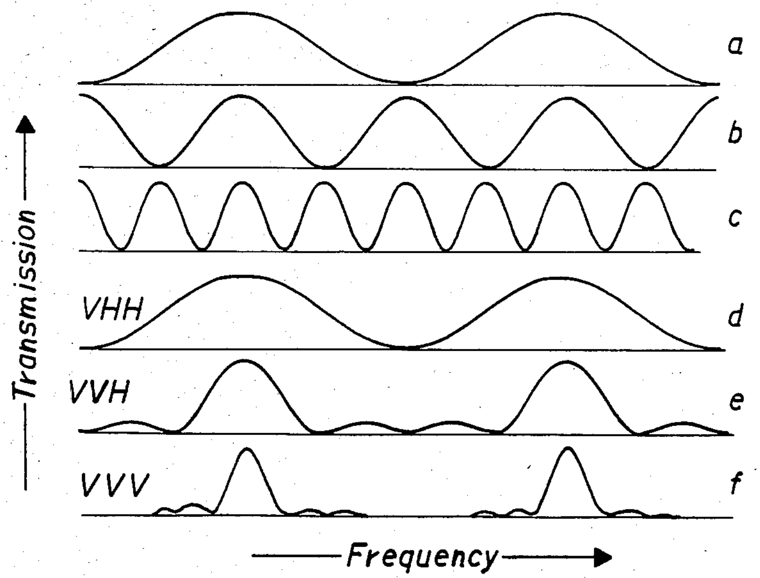
FIG. 2 shows the frequency distribution characteristics of the switchable bandwidth filter and shows how the bandwidths can be switched selectively.

In FIG. 2, the frequency response of each block 7 taken individually with input polarizer 7 is seen with the optic axis vertically disposed. The output frequency selectivity is highest with a block of the greatest thickness, and is least with the block of smallest thickness. More particularly, the frequency selectivity corresponds to the thickness of the block 7.

In the embodiment shown, thickness "c" is twice thickness "b", which in turn is twice thickness "a". Accordingly, the frequency selectivity of a block 7 of thickness "c" will be twice the frequency selectivity from a block of thickness "b". And the frequency selectivity of block 7 of thickness "b" will in turn be twice the selectivity of a block of thickness "a". This is shown in respective curves a, b and c of FIG. 2.

Additionally, FIG. 2 shows the consequence of vertically aligning the optic axes of first only the least thick block 7 and leaving the remaining blocks' axes horizontal and in the direction of propagation. This produces the bandwidth of curve "d" in FIG. 2.

By additionally switching the middle block optic axis in the vertical direction, a bandwidth according to curve "e" of FIG. 2 is achieved. Finally, with all three optic axes vertical, the narrowest possible bandwidth is developed.

In operation, the voltage difference 12 can be individually switched between selected electrode pairs to flip-flop the optic axis of the ferroelectric material from one domain state orientation to the other. With the axis aligned with the direction of progress of the radiation, the particular block is transparent to the transmission and no impact upon the bandwidth is effected. If, however, the optic axis of a specific block is perpendicular to the direction of propagation, a narrowing of the bandwidth will generally result, because of the frequency selective interaction between the induced polarization due to the birefringence of the material and the fixed polarization defined by the transparent wire grid electrodes. The polarization direction favored for transmission by the wire grid electrodes may all be parallel, as shown in FIG. 1, or may be different according to the bandwidth characteristic desired. Then the system of electrodes can switch between transmitting the unmodified radiation and producing the radiation in altered form, as desired with a choice of several bandwidths possible, depending upon the number and the character (i.e. width) of the ferroelectric elements and stages selected and activated.

Ferroelectric materials may have more than a single optic axis. Accordingly, a complex variety of domain orientations including biaxial anisotropy is possible.

Additionally, ferroelectric materials can be produced as polycrystaline mixtures, which are especially useful. In particular, mixtures in an inert isotropic medium are of interest to component developers. Polycrystaline mixtures are preferred because of the difficulty of growing single large crystals. For example, a low-index of refraction isotropic medium may be randomly doped with oriented single-domain crystals of a given ferroelectric in appropriate concentrations, endowing the medium with ferroelectric-like properties of the desired kind. Structured composites could also be employed for the ferroelectric mixture.

After reference to the foregoing, modifications may occur to those skilled in the art. However, it is not intended that the invention be limited to the specific embodiment shown. The invention is broader in scope and includes all changes and modification falling within the parameters of the claims below.

I claim:

1. A filter device for switching between bandwidth states of a beam of millimeter wavelength radiation, comprising:

a plurality of stages of a material medium each having parallel input and output walls, and a pair of opposite sides, one of said pairs being horizontally and the other vertically disposed, each said medium being birefringent and having an optical axis and having at least two possible directions of orientation for said optic axis, and one of said directions being disposable parallel to the propagation of said beam of millimeter wavelength radiation;

at least two pairs of electrodes for each medium, each of said pairs straddlingly adjacent a corresponding one of said media, each of said pairs of electrodes being generally plane-parallel with respect to each other and each of said pairs of electrodes being orthogonal to a different one of said two directions of said optic axis; and selective means for selectively providing electric power to selected ones of said pairs of electrodes and then to others of said pairs of electrodes, whereby an electric field is capable of establishment and disestablishment with respect to said material media and thereby effective for reorienting the optic axis of said material media from one direction to the other whereby the bandwidth of said millimeter wavelength radiation is discretely variable.

2. A method of switching between selected bandwidths of a beam of millimeter wavelength radiation, comprising the steps of:

directing a beam of radiation having millimeter wavelength characteristics at a series of material media having parallel input and output walls, and a pair of opposite sides, said media being birefringent and having an optic axis and each having at least two possible directions of orientation for said optic axis, one of said directions being disposed in the direction of propagation of said beam of millimeter wavelength radiation;

disposing at least two pairs of electrodes for each medium straddlingly adjacent said material medium, each of said pairs of electrodes being orthogonal to a different one of the directions of said optic axis; and applying an electric field to selected ones of said pairs of electrodes and thereby to said material medium for reorienting the said optic axis of said material medium from one direction to another, whereby the bandwidth of radiation passing through said material media is selectively variable.

3. The device of claim 1, wherein at least one of said pairs of electrodes is in the path of said beam of millimeter wavelength radiation.

4. The device of claim 1, wherein at least one of said pairs of electrodes is transparent to said beam of millimeter wavelength radiation.

5. The device of claim 1, wherein at least one of said pairs of electrodes is a wire grid polarizer.

6. The device of claim 1, wherein pairs of said input and output walls share a common electrode.

7. The device of claim 1, wherein each of said pairs of electrodes is capable of electric pulse energization, whereby an electric field of specific duration is established in said material medium.

8. The device of claim 1, wherein at least two of said pairs of electrodes are arranged in crossed configuration.

9. The device of claim 1, wherein said material medium is ferroelectric.

10. The device of claim 1, wherein said material medium includes barium titanate.

11. The method of claim 2, wherein at least one of said pairs of electrodes is in the path of said beam of millimeter wavelength radiation.

12. The method of claim 2, wherein at least one of said pairs of electrodes is transparent to said beam of millimeter wavelength radiation.

13. The method of claim 2, wherein at least one of said pairs of electrodes is a wire grid polarizer.

14. The method of claim 2, wherein pairs of said input output walls share a common electrode.

15. The method of claim 2, wherein each of said pairs of electrodes is capable of electric pulse energization, whereby an electric field of specific duration is established in said material medium.

16. The method of claim 2, wherein at least two of said pairs of electrodes are arranged in crossed configuration.

17. The method of claim 2, wherein said material medium is ferroelectric.

18. The method of claim 2, wherein said material medium includes barium titanate.

* * * * *